INVENTOR.
Eugene A. Carsey
BY
Walter S. Murray
ATTY.

United States Patent Office 3,314,098
Patented Apr. 18, 1967

3,314,098
DUST COLLECTING PLENUM INSTALLATION
Eugene A. Carsey, Cincinnati, Ohio, assignor to The Kirk & Blum Manufacturing Co., Cincinnati, Ohio, a corporation of Ohio
Filed Sept. 14, 1964, Ser. No. 396,131
5 Claims. (Cl. 15—301)

This invention relates to improvements in dust control systems and is particularly directed to a permanent dust collecting plenum installation for manufacturing plants that will permit relocation and/or changing the number and kinds of machinery units in the factory area served by the plenum without materially affecting the efficiency of the original installation.

The main object of the invention is to provide a heavy duty plenum installation for effective and efficient removal of dust, chips and manufacturing refuse of large particulate created by a number of machines in a plant area, said heavy duty plenum having built-in flexibility permitting relocation and substantial increase or decrease of the numbers and sizes of machines served by the plenum.

Another object of the invention is to provide a plenum installation having the foregoing characteristics which has a full, free flow of air inside the installation for the more efficient and effective clog free transmission of dust, chips and manufacturing refuse therethrough.

A further object of the invention is to provide a permanent dust collecting plenum having a number of longitudinally spaced apart dust collecting troughs along its bottom, each trough being directly connected by an individual high velocity conduit to the intake of an exhaust fan to thereby secure greater service flexibility for the collector and a high degree of efficiency under all operating conditions including projected plant expansion and the additional requirements to be placed on the plenum.

With these and other objects in view the preferred form of my invention is described in the following specification and illustrated in the accompanying drawings, wherein.

Figure 1:
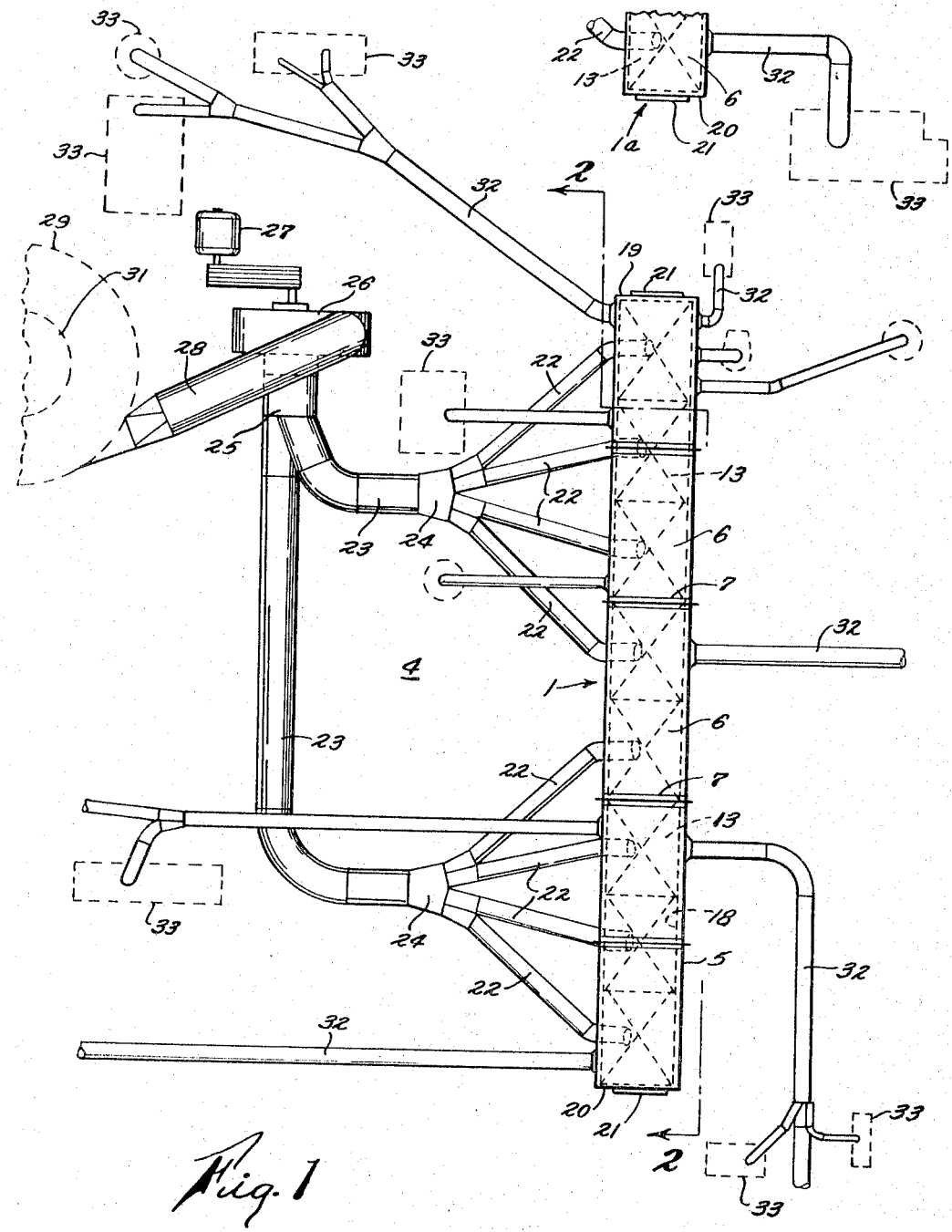
FIG. 1 is a schematic, plan view of a plant floor layout utilizing my dust collecting plenum installation.
Figure 2:
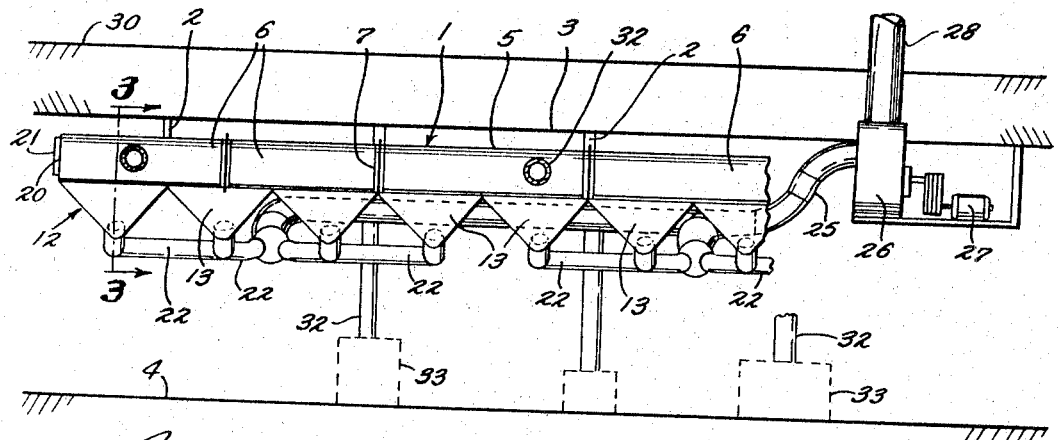
FIG. 2 is a section taken on line 2—2 of FIG. 1.
Figure 3:
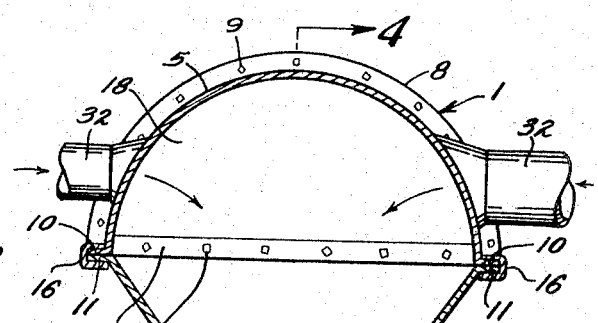
FIG. 3 is an enlarged section taken on line 3—3 of FIG. 2.
Figure 4:
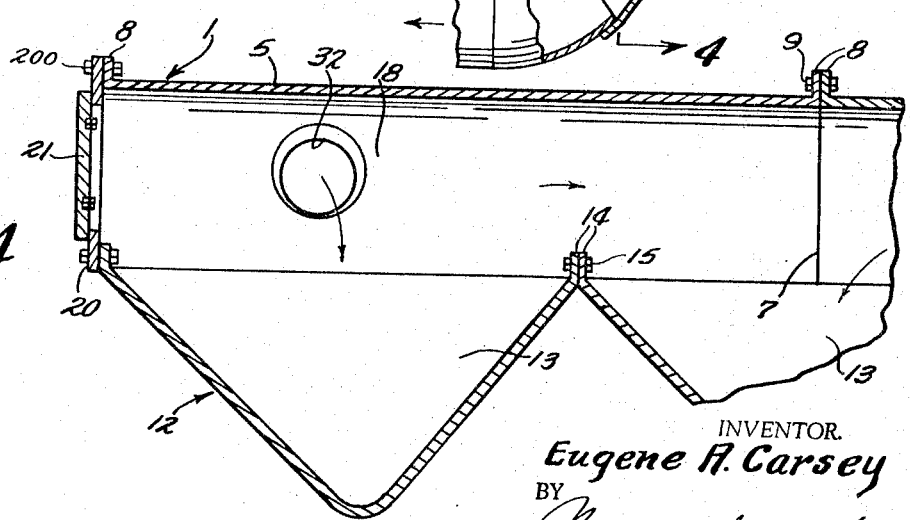
FIG. 4 is a section taken on line 4—4 of FIG. 3.

With particular reference to FIGS. 1 and 2 of the drawings which are exemplary of my plenum type dust collecting installation, the numerals 1–1a indicate a pair of like, elongated manifolds secured in longitudinal alignment by spaced apart hangers 2 to the ceiling 3 of the usual floor area 4 of a wood-working plant, or the like. This manifold has a semi-circular, sectionalized top wall 5 coextensive with the length of the manifold and made up of sections 6 laterally fastened together by suitable sheet metal joints 7. With reference to FIGS. 3 and 4 of the drawings it will be seen that the joints 7 between the sections 6 are preferably constructed by forming identical out-turned flanges 8—8 on the opposite ends of the top wall of each section 6 and then securing the flanges of adjacently positioned sections 6 together by a number of bolts 9. As best shown in FIG. 3 the opposed longitudinal edges 10—10 of the top wall 5 are bent outwardly and are engaged by out-turned flanges 11—11 formed on a sectionalized manifold bottom 12 that is constituted by a longitudinal series of downwardly convergent, dust entraining and transferring troughs or hoppers 13. The hoppers 13 are identical in construction and size and are provided with lateral upstanding end flanges 14 (FIG. 4) connected together by bolts 15.

The longitudinal edges 10—10 of the top wall and the respective flanges 11—11 of the manifold bottom are clinched together by U-strip connectors 16—16, and it will be understood with reference to FIGS. 3 and 4 that the top wall forms with the bottom a continuous and unrestricted passageway 18 coextensive with the manifold for the free passage of dust laden air therethrough in response to the changing and varying pressures existing within the manifold. The manifold is closed at its ends by flat lateral walls 19 and 20 each secured to the flange 8 of the end section by bolts 200. Each lateral wall 19 and 20 has a clean-out door 21, therein.

As best shown in FIG. 1 the manifold 1 is preferably but not necessarily provided with an even number of hoppers 13 and the lower restricted end of each hopper has an individual branch pipe or conduit 22 connected to it and communicating with the interior thereof. It is to be understood that the manifold may be installed with any number of hoppers therein and that after installation of a manifold, additional hoppers may be subsequently connected to the manifold by reason of the interfitting flanges 8—8 of the sections 6 and the fact that the end walls 21 can be secured to the end flange 20 of any section 6. It will be noted that half of the branch pipes 22 serve one group of hoppers 13 at an end of the manifold and are led into the end of a relatively larger main pipe 23 by means of a fitting 24 while the remaining half of the branch pipes 22 serve the remaining group of hoppers 13 at the opposite end of the manifold and are led into the end of another main pipe 23 by a similar fitting 24. The two main pipes 23 are joined at their exhaust ends by a fitting 25 that in turn communicates with the intake side of an exhaust fan 26 driven by an electric motor 27. The discharge side of the fan 26 is connected by a discharge pipe 28 to a cyclone dust collector 29, preferably situated on the roof 30 of the factory. This cyclone is of conventional design and is not detailed in the drawing; it being sufficient to say that particles are separated from the dust ladened air introduced therein through the pipe 28 by centrifugal action of the cyclone, cleaned air being discharged to atmosphere through an opening 31 whilst the particles fall by gravity into the bottom of the cyclone and are removed therefrom, in any suitable manner.

Feeder pipes 32 of varying lengths and capacities are tapped into the manifold 1 through the top wall 5 at selected points along the continuous length thereof as the dust collecting requirements of the factory area require them, it being understood that the original manifold 1, its branch pipes 22, the mains 23 and the fan 27 are permanent installations devised to have a dust collecting capacity that will serve the immediate requirements of the factory area and the projected future dust removing requirements of said area in a highly efficient manner. In FIG. 1 of the drawings the remote or initial ends of the feeder pipes 32 are represented as connected, in any suitable manner, to open booths, hoods or nozzles associated with individual, wood working machines 33, such as for example, sanders, saws, copy lathes, profilers, shapers, planers, jointers, floor sweeps, and the like. Depending on the manufacturer's requirements the number and positions of these machines, within the area, may be changed to meet operating conditions and the feeder pipes readily tapped into or blanked out of the permanent manifold without changing the manifold installation itself and without loss of efficiency when, and if, such changes are made.

Now with reference to FIG. 1 it is to be observed that the permanently installed manifolds 1 and 1a are in longitudinal alignment, that said pair of manifolds serve different parts of the floor area of the plant and that the adjacent ends of the manifolds are spaced apart a distance equivalent to the combined lengths of two of the manifold hoppers 13. It is to be understood that the spacing between manifolds will vary with each particular plant installation and that such spacing will always be one hopper length or a multiple thereof depending upon the particular dust collecting requirements of the specific plant area. The connecting together of spaced manifolds or the addition of one or more hoppers to existing manifolds is readily accomplished by reason of the standardization of the hopper and top wall sections and the removable end walls on the manifolds. Thus by adding hopper sections and connecting these individual branch lines into fittings having a greater number of branch line connections the dust collecting requirements of a plant area can be increased to efficiently handle expanding plant facilities.

In operation, for example, the fan 26 will be driven at full capacity by the motor 27 that may be rated at 100 horsepower at 1750 r.m.p. to provide movement of dust ladened air at high velocity through twenty-eight (28) inch diameter mains 23 and fourteen (14) inch diameter branch pipes 22 for discharge of said dust ladened air through the pipe 28 of forty (40) inch diameter to the dust separating cyclone 29. The intake of high velocity, dust ladened air carried by the dust mains 23 is equally proportioned along the entire length of the manifold 1 by the capacities and positions of the branch pipes 22 which connect the equally spaced apart manifold troughs 19 to the main with pipes having the same diameters. Thus, it will be understood that the main object of the system is expansion of facilities in a manufacturing area served by a permanently installed dust collecting manifold and that flexibility with minimal power costs are an immediate and continuing requirement therefor. The manifold hoppers each have properly proportioned short connections with the constant vacuum source of the system thus reducing friction losses to fluid flow and benefiting by power savings. The manifold can be operated efficiently at full volume regardless of the numbers and capacities of the dust feeder pipes connected at any one time to and in any places along the manifold.

What is claimed is:

1. In a dust collecting system of the class described the combination of an elongated manifold permanently installed in a manufacturing area, and comprising a bottom having a longitudinal series of downwardly convergent dust entraining and transferring hopper groups therein, a top wall for the manifold spaced above the bottom and forming with the bottom a continuous, closed and unrestricted passageway coextensive with the manifold, said top wall being adapted for connection with dust feeder pipes throughout its length, a plurality of feeder pipes connected to said top wall, said feeder pipes having their remote inlet ends connected to dust creating machinery in the manufacturing area, an independent suction and dust conveying branch pipe connected to the restricted bottom of each of the hoppers, a common suction source for the system, main pipes feeding into the common suction source, a fitting positioned on the end of each main pipe, and the branch pipes serving each group of hoppers feeding into a common fitting.

2. In a dust collecting system as set forth in claim 1 wherein each fitting is disposed centrally alongside each hopper group.

3. In a dust collecting system as set forth in claim 2 further characterized by the fact that all the branch pipes have the same capacities.

4. In a dust collector system as set forth in claim 3 also characterized by the fact that the main pipes have substantially the same capacities.

5. In a dust collector system as set forth in claim 4 still further characterized by the fact that the main pipes have different lengths.

References Cited by the Examiner
UNITED STATES PATENTS

| | | | |
|---|---|---|---|
| 1,555,191 | 9/1925 | Delaney | 19—263 |
| 1,667,177 | 4/1928 | Trout | 19—107 |
| 1,842,409 | 1/1932 | Kirk et al. | 302—27 |

References Cited by the Applicant
UNITED STATES PATENTS

| | | |
|---|---|---|
| 1,589,427 | 6/1926 | Rogers. |
| 1,594,539 | 8/1926 | McSweeney. |
| 1,610,358 | 12/1926 | Caller. |
| 1,772,017 | 8/1930 | Russell. |
| 1,842,416 | 1/1932 | Ludwig. |
| 2,012,077 | 8/1935 | Bingman. |

ROBERT W. MICHELL, *Primary Examiner.*